(12) United States Patent
Lo (10) Patent No.: US 6,501,196 B1
(45) Date of Patent: Dec. 31, 2002

(54) FAULT TOLERANT AC TRANSFER SWITCH (75) Inventor: Kirk Earnshaw Ming Teh Lo, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 108 days.

(21) Appl. No.: 09/660,113

(22) Filed: Sep. 12, 2000

(51) Int. Cl.$^7$ ................................................ H01H 83/00
(52) U.S. Cl. ........................... 307/125; 307/85; 307/86; 307/64; 361/62
(58) Field of Search ........................... 307/125, 64, 85, 307/86, 87

(56) References Cited

U.S. PATENT DOCUMENTS

| 5,739,594 | A | * | 4/1998 | Sheppard et al. ............ 307/64 |
| 5,770,897 | A | * | 6/1998 | Bapat et al. ................ 307/127 |
| 5,939,802 | A | * | 8/1999 | Hornbeck .................... 307/87 |
| 6,011,327 | A | | 1/2000 | Cook et al. |
| 6,031,298 | A | | 2/2000 | Lo et al. |
| 6,163,088 | A | * | 12/2000 | Codina et al. ............... 307/64 |
| 6,330,176 | B1 | * | 12/2001 | Thrap ........................ 363/142 |

* cited by examiner

Primary Examiner—Stephen W. Jackson
Assistant Examiner—Robert Deberadinis
(74) Attorney, Agent, or Firm—Brooks & Kushman, P.C.

(57) ABSTRACT

A redundant power distribution system and method of operation for transferring electrical power from one of several power sources to a load are disclosed. The system comprises one or more copies of a switching circuit with each switching circuit connectable to a power source. Each switching circuit monitors a voltage representative of its power source. The voltage being delivered to the load is also monitored by each switching circuit to detect a failed-open switching circuit. Arbitration is performed among the switching circuits detecting healthy power sources to select one power source to drive the load. Once a switching circuit has won arbitration, it continues to transfer power to the load until its power source fails or the switching circuit itself fails. The hardware can be partitioned in many ways. In one embodiment, two identical switching circuits with redundant hardware functions enable one switching circuit to be removed and replaced without disrupting the load that remains powered through the remaining switching circuit.

18 Claims, 8 Drawing Sheets

FAULT TOLERANT AC TRANSFER SWITCH

TECHNICAL FIELD

The present invention is related to the field of redundant alternating current power switching systems.

BACKGROUND ART

Redundant electrical power distribution systems are used where electrical power must be delivered to one or more loads at all times. Redundant electrical power distribution systems allow the loads to continue consuming power during an event that disrupts a flow of power from a primary power source. Power distribution systems, where reliability or safety are extremely important, will often use double or even triple redundant connections to two or three independent power sources. Success or failure of the redundancy is dependent upon the ability to tolerate a power disrupting event in one or more of the power sources and failures within the power distribution system itself.

A variety of events may take place that may result in disruption of power to the load. A typical power disrupting event is a failure in one of the power sources feeding the redundant power distribution system. These events may occur at any time for a variety of reasons. Another common power disrupting event is human error. For example, a person intending to remove electrical power from one load may accidently switch off an incorrect circuit breaker and thus remove electrical power from the critical load instead. Power disruption may also be initiated intentionally by a person performing a maintenance action on the power distribution system. A third event is hardware failure in the power distribution system.

Existing redundant power distribution systems account for the disruption events using one of several techniques. One approach is to provide full redundant systems between independent AC power sources an a common set of DC bus bars that supply the load. Here, duplicate sets of wiring, circuit protection, safety devices and AC/DC power converters are operated simultaneously and in parallel to deliver DC electrical power to the bus bars at all times. A disruption in any one set is unnoticed by the load. This approach, however, has several disadvantages. One disadvantage is that the AC/DC converters must be co-regulated to provide one common voltage at the bus bars. Another disadvantage is that large gauge wires must be used between the bus bars and the load(s) to minimize $I^2R$ losses at the lower DC voltages. Still another disadvantage is that the load must be designed to operate from a DC voltage input, whereas most industrial and commercial loads are designed to operate from AC voltage.

Another common redundancy approach is to provide an AC switching mechanism that can connect the load to one of several AC power sources at any given moment. Advantages of this approach are that it is simple to implement and it results in AC power being directed to the load instead of DC power. A disadvantage of this approach is that a single point failure in the AC switching mechanism may result in no electrical power reaching the load. Another disadvantage is that the switch may fail in a mode that shorts two of the independent power sources together.

Where electrical power is selected from only one of several power sources at a time, the redundant power distribution system must have a mechanism for deciding which power source to use, and when to transition to another power source. A fixed master/slave approach is commonly used to make these decisions. The power distribution system defaults to receiving power from a fixed master power source. When the master power source fails, the power distribution system switches the load to the slave power source. In the event that the master power source recovers, the power switching system returns the load to the master power source. An advantage of this method is simplicity. Only the master power source must be monitored for failures, and if none are detected, then the master power source is selected to drive the load. A disadvantage is that an oscillating between the master and slave power sources may result when the master power source is experiencing an intermittent failure, or is producing marginal quality power.

What is desired is a power distribution system that allows AC electrical power to be provided from one or more independent AC power sources to an AC load. The power distribution system should have an ability to detect faults in the power sources and itself, and respond by switching the load to another power source. Transitioning between power sources should be performed only when necessary to maintain electrical power to the loads.

DISCLOSURE OF INVENTION

The present invention is a redundant power distribution system and method of operation for transferring electrical power from one of several power sources to a load. The system comprises one or more copies of a switching circuit with each switching circuit connectable to an independent power source. Each switching circuit monitors a voltage representative of its power source. The voltage being delivered to the load is also monitored by each switching circuit to detect a failed-open switching circuit. Arbitration is performed among the switching circuits detecting healthy power sources to select one power source to drive the load. Once a switching circuit has won arbitration, it continues to transfer power to the load until its power source fails or the switching circuit itself fails.

In an alternative embodiment, the switching circuit includes a self-test capability to detect a failed-closed condition of a main switch. A line switch in series with the main switch is opened upon detection of a failed-closed condition of the main switch. A safety switch may also be connected in series with the main switch and wired to electrically isolate a dangling plug should the switching circuit become unplugged from its power source.

At the system level, the load voltage sensing function of the individual switching circuits may be combined into one load sensor for the entire system. Likewise, the arbitration among the switching circuits function may be allocated to a single arbitrator external to the switching circuits. Furthermore, control of the main switches of the multiple switching circuits may be allocated to a single control function for the system. Here, arbitration among the switching circuits is selection of one main switch to power the load. Physically partitioning the circuit into two or more removable modules makes it possible to perform non-disruptive maintenance while the load continues to receive power.

Accordingly, it is an object of the present invention to provide a switching circuit, system of switching circuits, and method for controlling transfer of electrical power to a load from one power source at a time selected from among one or more power sources. In operation, a power source selected to drive the load will continues to drive the load until it fails or its associated switching circuit fails.

These and other objects, features and advantages will be readily apparent upon consideration of the following detailed description in conjunction with the accompanying drawings.

BEST MODE FOR CARRYING OUT THE INVENTION

Figure 1:
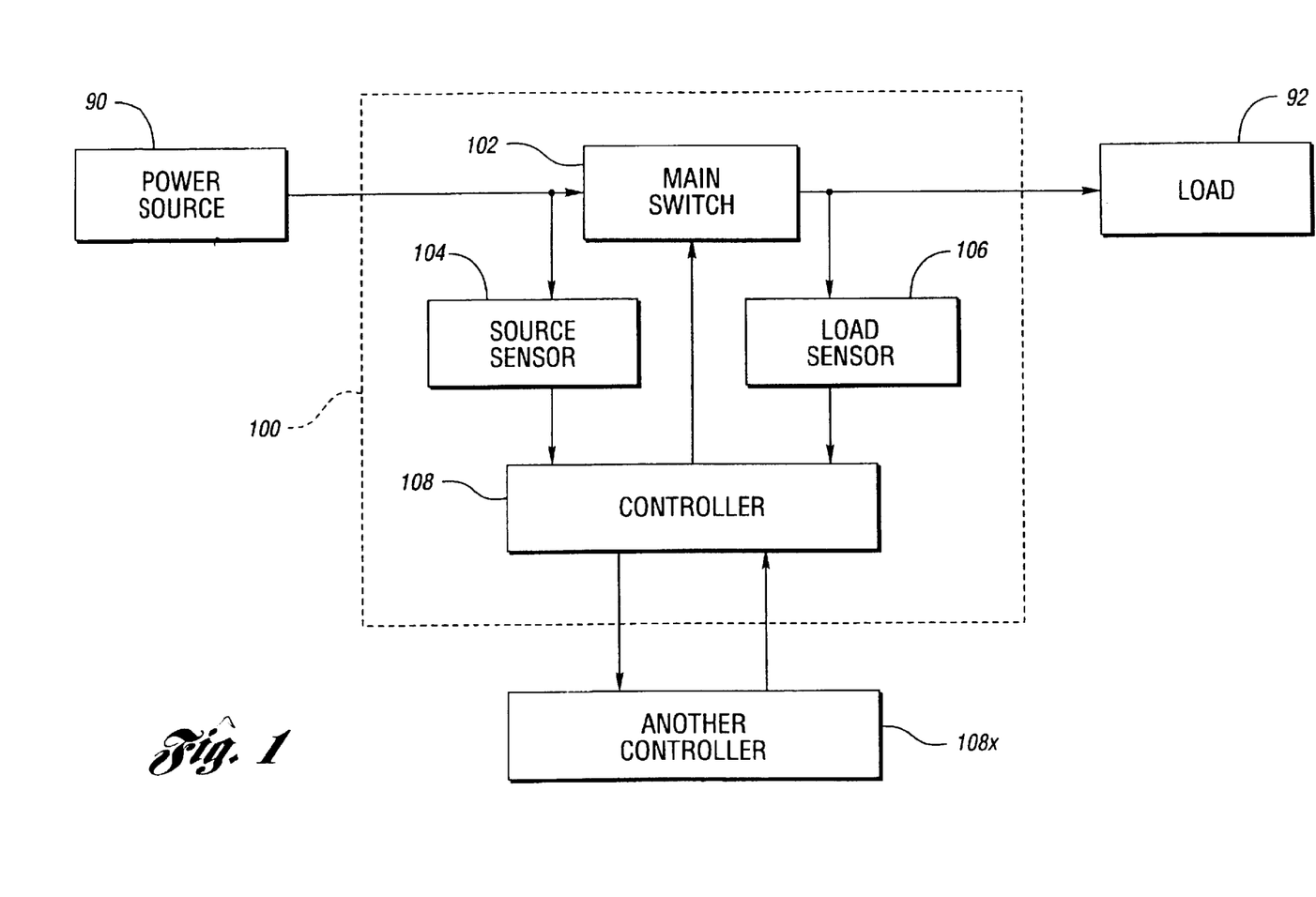
FIG. 1 is a block diagram of a switching circuit.

An example of a switching circuit 100 that implements the present invention is shown in FIG. 1. The switching circuit 100 is connectable between a power source 90 and a load 92. Power source 90 may generate single phase or multiple phase alternating current type power, or direct current type power. Load 92 consumes the same type of electrical power that power source 90 produces.

Switching circuit 100 includes a main switch 102 connectable between the power source 90 and load 92. Main switch 102 may be an electromechanical, solid state, or similar type of device capable of switching the electrical power produced by the power source 90. Main switch 102 may be a single device, or multiple devices operated in parallel to handle large currents and/or multiple phases of a multi-phase type power source 90. In the preferred embodiment, main switch 102 is a sold state relay having a switching time of 30 milliseconds of less. Devices having longer switching times may be used within the scope of the present invention. Main switch 102 has an open state and a closed state responsive to a main switch control signal having an open value and a closed value respectively.

Switching circuit 100 also includes a source sensor 104. Source sensor 104 samples a source voltage representative of that produced by the power source 90. The source voltage is compared to a predetermined standard for the power source 90 to determine if power source 90 is supplying electrical power within the predetermined standard. Source sensor 104 outputs a source status signal indicating the results of the comparison. A pass value is asserted for the source status signal when the source voltage is within the predetermined standard. A fail value is asserted for the source status signal when the source voltage is outside the predetermined standard. The comparison may be as simple as a comparing the peak source voltage against a minimum threshold. In other embodiments, the comparison may require monitoring the source voltage over time to verify that the peak voltage remains within tolerance and that any transients present in the voltage are also within tolerance of the predetermined standard.

Source sensor 104 may sense the source voltage anywhere between the main switch 102 and the power source 90. Ideally, source sensor 104 would have a dedicated set of sense wires (not shown) connected directly to the output terminals of the power source 90. In practice, standard electrical power connectors do not account for sense wires, so source sensor 104 typically senses the source voltage from a point internal to the switching circuit 100. In the preferred embodiment, source voltage sensing is preformed line-to-line for dc and single phase ac power. Other sensing techniques such as line-to-earth ground and line-to-neutral may also be employed.

Switching circuit 100 includes a load sensor 106. Load sensor 106 operates in a similar fashion as the source sensor 104. Load sensor 106 samples a load voltage representative of the voltage at the load 92. The load voltage is compared to a predetermined standard for the load 92 to determine if the load 92 is receiving electrical power compliant with the predetermined standard. Generally, although not necessarily, the power standard for the load 92 is the same as the power standard for the power source 90. Load sensor 106 outputs a load status signal indicating the results of the comparison. The pass value is asserted for the load status signal when the load voltage is within the predetermined standard. The fail value is asserted for the load status signal when the load voltage is outside the predetermined standard. The comparison may be as simple as a comparing the peak load voltage against a minimum threshold. In other embodiments, the comparison may require monitoring the load voltage over time to verify that the peak voltage remains within tolerance and that any transients present in the voltage are also within tolerance of the predetermined standard.

Load sensor 106 may sense the load voltage anywhere between the main switch 102 and the load 92. Ideally, load sensor 106 would have a dedicated set of sense wires (not shown) connected directly to the input terminals of the load 92. In practice, standard electrical power connectors do not account for sense wires, so load sensor 106 typically senses the load voltage from a point internal to the switching circuit 100. In the preferred embodiment, load voltage sensing is preformed line-to-line for dc and single phase ac power. Other sensing techniques such as line-to-earth ground and line-to-neutral may also be employed.

Controller 108 is provided within the switching circuit 100 to control main switch 102. Controller 108 accepts the source status signal and the load status signal as inputs, and produces the main switch control signal as an output. Controller 108 is in communication with other controllers in other switching circuits that are also connected to the load 92, if any. FIG. 1 shows an example where one other controller 108X is present in the same system as switching circuit 100. In other embodiments, two or more other controller 108X, or zero other controllers may be present within the system containing switching circuit 100.

Figure 2:
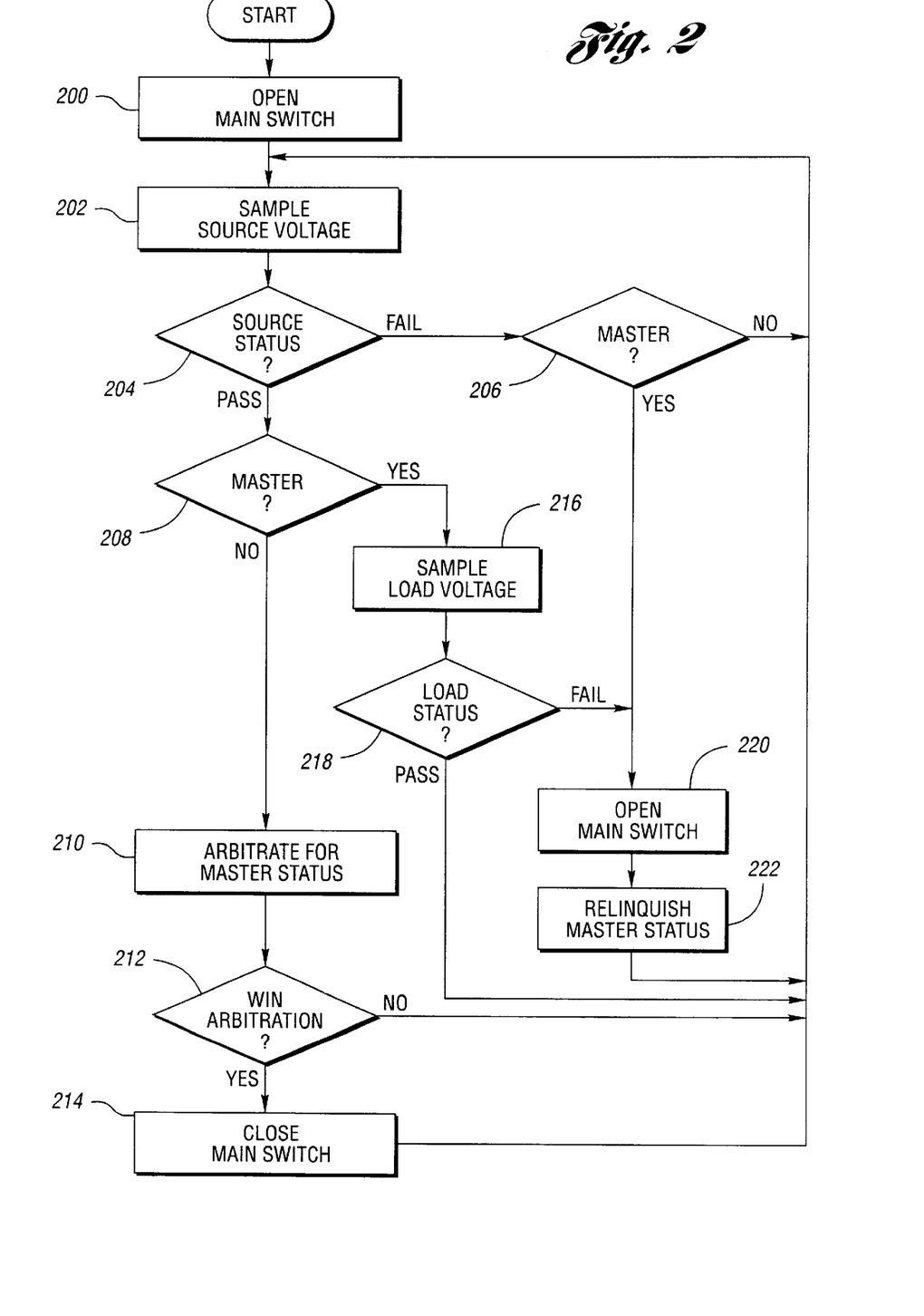
FIG. 2 is a flow diagram of a method of operating the switching circuit.

Operation of the switching circuit 100 is shown in a flow diagram in FIG. 2 with references to the block shown in FIG. 1. A default condition for switching circuit 100 is for main switch 102 to be in the open state, as shown in block 200. Source sensor 104 samples the source voltage, as shown in block 202, to produce the source status signal. Controller 108 examines the source status signal to determine if the power source 90 is healthy or not. If the source status signal asserts the fail value, the FAIL branch of decision block 204, then controller 108 checks to see if it has a master status, as shown by decision block 206. If the source status signal has the pass value, the PASS branch of decision block 204, then controller 100 again determines if it has the master status, this time shown by decision block 208.

The following operational thread assumes that the power source is healthy, the PASS branch of decision block 204, and that the controller 108 has a slave status (not master status), the NO branch of decision block 208. Here, controller 108 will arbitrate with any and all other controllers 108X in the system for the master status, as shown in block 210. If another controller 108X already has master status, or if another controller 108X wins arbitration, then controller 108 will lose arbitration, as shown by the NO branch of decision block 212. From this point, switching circuit 100 continues around a loop of monitoring the source voltage, block 202, and arbitrating for master status, block 210.

When controller 108 wins arbitration due to all other controllers losing master status and power at source 90 being good, the YES branch of decision block 212, then it obtains the master status and all other controllers 108X in the system has the slave status. Here, the controller 108 asserts the open value on the main switch control signal causing the main switch 102 to enter the closed state, as shown in block 214. Electrical power from power source 90 is then transferred through switching circuit 100 to load 92.

The following operational thread assumes that the controller 108 has the master status, the YES branch of decision block 208. Load sensor 106 samples the load voltage to produce the load status signal, as shown in block 216. If the load status signal is pass, the PASS branch of decision block 218, then controller 108 takes no action and a loop around sampling the source voltage, block 202 and sampling the load voltage, block 216 continues.

Should the load status signal assert the fail value, the FAIL branch of decision block 218, then controller 108 sets the main switch control signal to the open value causing the main switch 102 to transition to the open state, as shown in block 220. Controller 108 then relinquishes the master status, as shown in block 222. The relinquished master status allows another controller 108X in the system to obtain master status, close its main switch (not shown in FIG. 1) and provide power to the load 92 from another power source (not shown in FIG. 1).

Returning to decision block 206, it is possible that the switching circuit 100 will detect a failure in the power source voltage prior to sensing a failure in the load voltage. If the controller 108 does not have master status, the NO branch of decision block 206, then switching circuit continues to monitor its own power source 90. If the controller 108 does have master status, the YES branch of decision block 206, then main switch 102 transitions to the open state in block 220 and controller 108 relinquishes master status, as shown in block 222. Here again, master status is now available for arbitration among the other controllers 108X in the system for the right to power the load 92.

Figure 3:
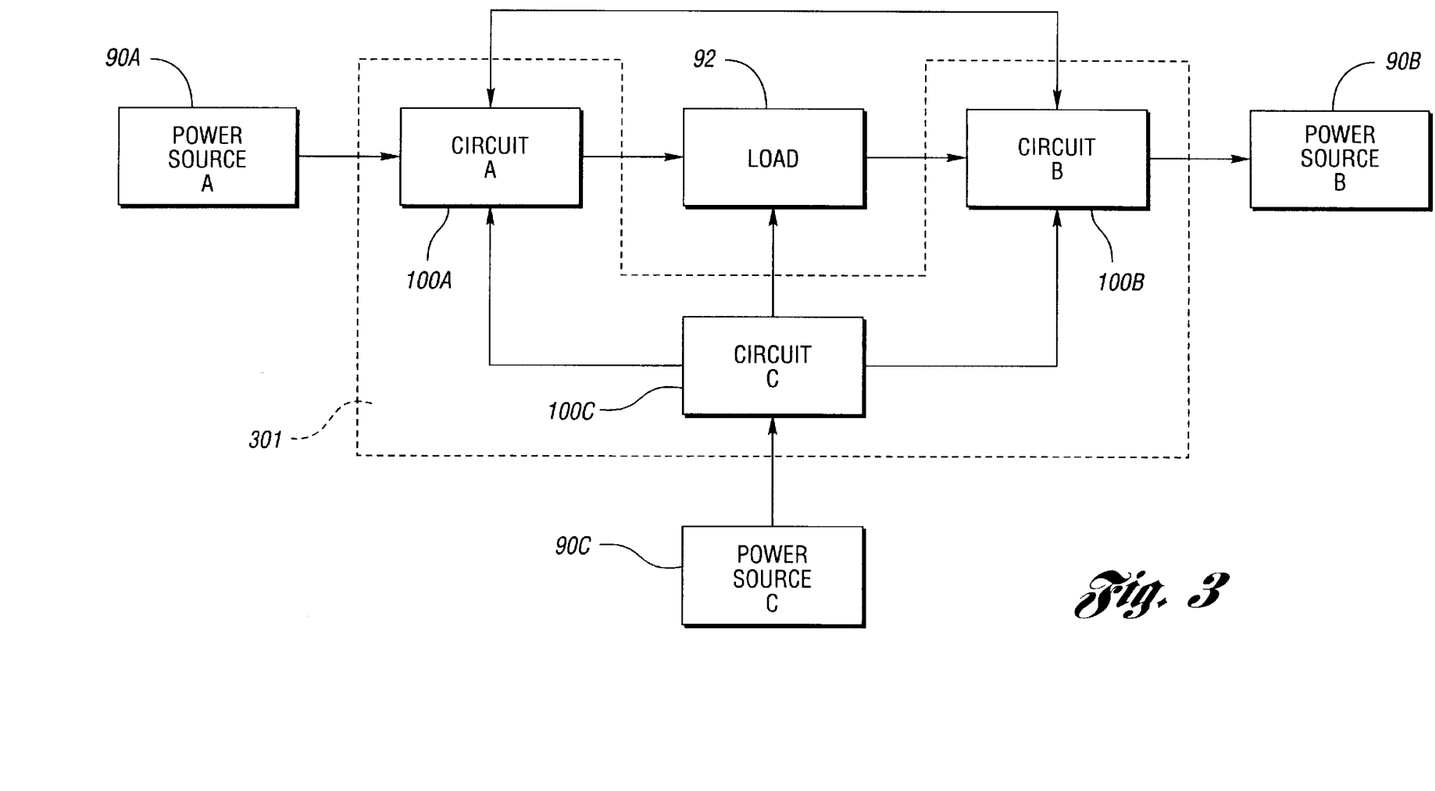
FIG. 3 is block diagram of a first system embodiment incorporating the switching circuit.

FIG. 3 is an example of a triple-redundant power switching system 301. Each switching circuit 100A–C is a identical copy of the switching circuit 100 shown in FIG. 1. Power supplies 90A–C are independent sources, each connectable to one of the switching circuits 100A–C respectively. Load 92 is connectable to all three switching circuit 100A–C.

Operation of each switching circuit 100A–C within the system 301 is the same as shown in FIG. 2. All three switching circuits 100A–C monitor their respective power sources 90A–C, monitor the load 92, and arbitrate with each other for master status. Since only one of the switching circuits, for example switching circuit 100A, will have the master status at any given time, then only that switching circuit 100A will transfer power from its respective power source 90A to the load 92. The other two switching circuits 100B–C will have slave status, keep their main switches (not shown in FIG. 3) in the open state, and wait for the master switching circuit 100A to relinquish the master status. When the master switching circuit 100A relinquishes the master status, the slave switching circuits 100B–C will arbitrate for the master status. In an alternative embodiment, switching circuit 100A is also allowed to arbitrate for the master status based upon some event happening after it has relinquished master status. The event may be a passage of time, source status signal within switching circuit 100A reasserting a pass value, or some other event that suggests or proves that power source 90A and switching circuit 100A are healthy.

Arbitration among the switching circuits 100A–C may be performed in a variety of fashions. Arbitration may be based upon, but is not limited to, a first-request-first-granted method, a token passing method, a priority scheme where each controller is assigned a different priority, a random selection method, or any other method that can allocate mastership to one and only one switching circuit 100A–C. In dual-redundant power switching systems where there are only two switching circuit 100A–B, then arbitration schemes may include interlocking, bi-stable and one bit logic methods where one of two possible choices is always selected.

An advantage of using multiple copies of switching circuit 100 is that a single point failure in any one switching circuit 100 will not disrupt operations of the other switching circuits 100. Each switching circuit 100 is self-contained in its voltage sensing ability and control logic. This approach even allows one switching circuit, for example switching circuit 100A of FIG. 3, to be removed from the system while switching circuit 100B transfers power from power source 90B to load 92.

Figure 4:
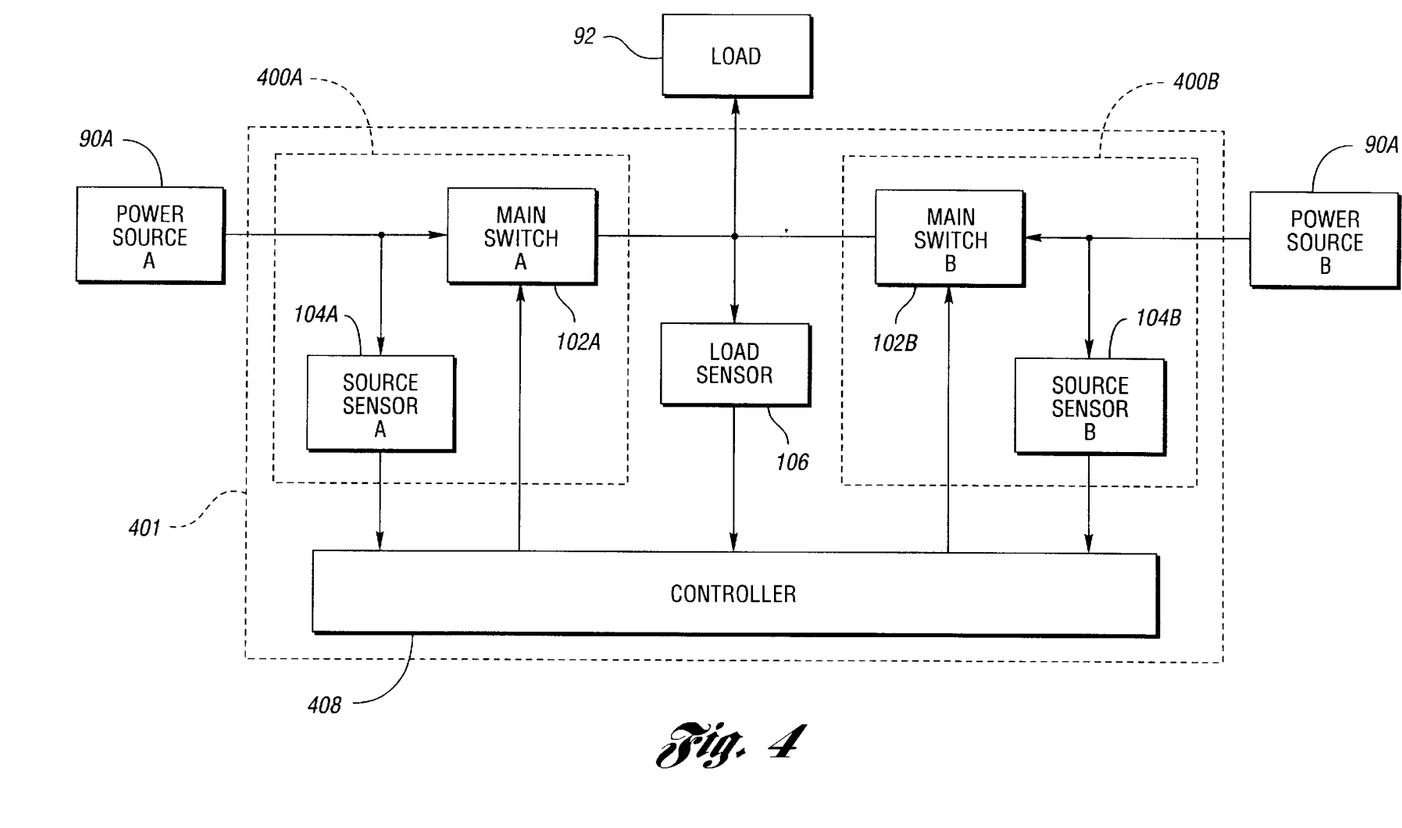
FIG. 4 is a block diagram of a second system embodiment.

Complete redundancy among multiple switching circuits 100 is not always required. Full redundancy incurs material, weight, space and power consumption costs that are not always desirable. FIG. 4 shows an example of a dual-redundant power switching system 401 having only one load sensor 106 and a common controller 408. In this embodiment, the two common circuits 400A–B comprise the main switches 102A–B and source sensors 104A–B respectively.

Common controller 408 is similar to the individual controller 108 shown in FIG. 1. One difference in the common controller 408 is that it receives multiple source status signals and outputs multiple main switch control signals. Another difference for the common controller 408 is that it arbitrates with itself. Here, arbitration for master status is allocating master status to one main switch from among the main switches 102A–B, or one common circuit from among the common circuits 400A–B.

Figure 5:
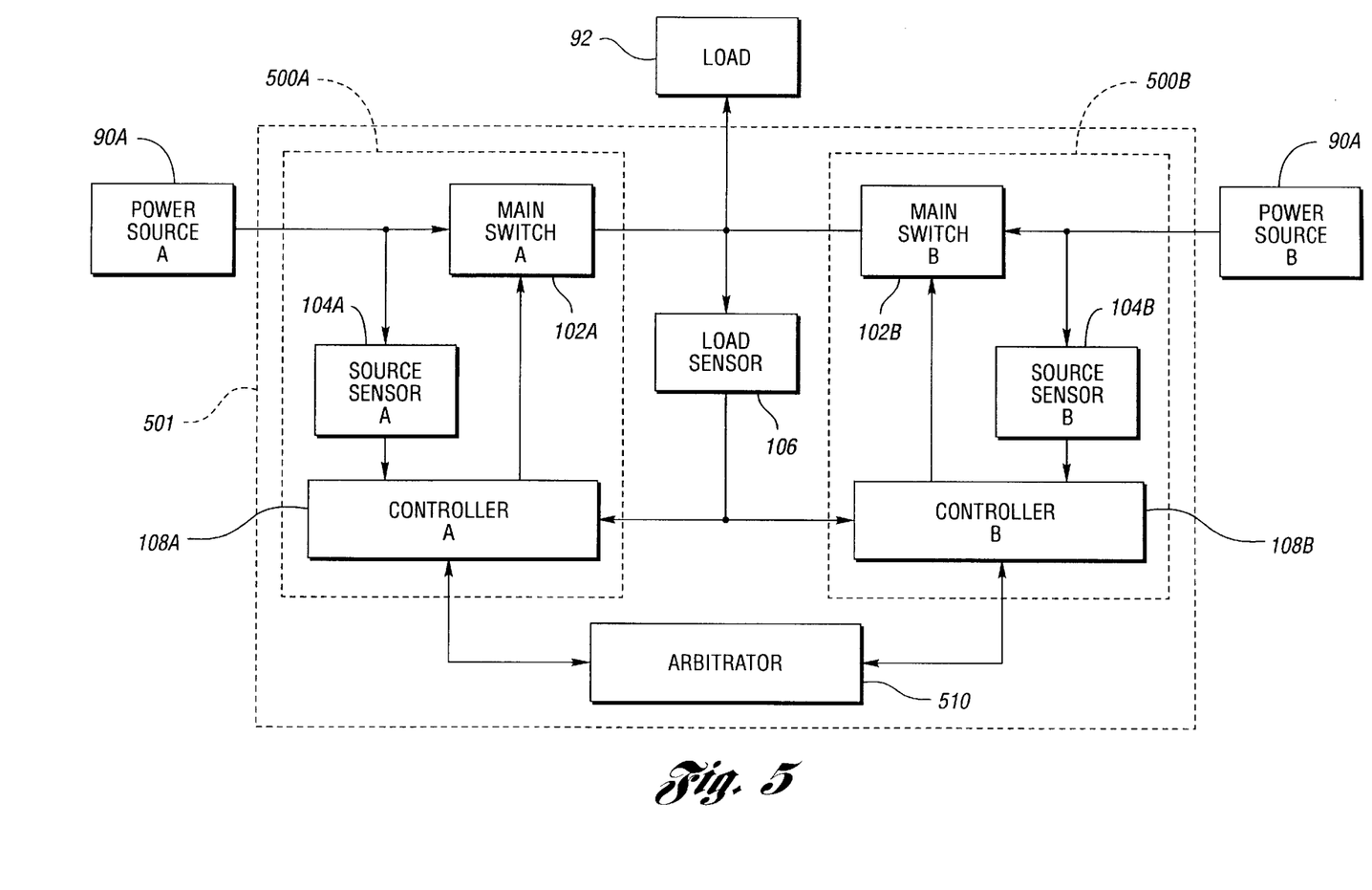
FIG. 5 is a block diagram of a third system embodiment.

FIG. 5 shows an alternative embodiment of the present invention where each common circuit 500A–B comprise the main switch 102A–B, source sensor 104A–B and controller 108A–B respectively. In this dual-redundant system 501, as in the dual-redundant system 401 shown in FIG. 4, only one load sensor 106 is employed. In this case, the load status signal produced by the load sensor 106 is provided to both controllers 108A–B simultaneously.

Another variation shown in this embodiment is that the arbitration functionality has been moved from the controllers 108A–B to an arbitrator 510. Now the controller 108A–B request master status from the arbitrator 510 which grants master status to one of the controllers 108A–B at a time. The one controller, for example controller 108A, that loses the master status commands main switch 102A to the open state to isolate power source 90A from the load 92 and the other power source 90B. Controller 108B wins master status and then closes its main switch 102B to transfer electrical power from power source 90B to the load 92.

This embodiment allows the arbitration scheme implemented by the arbitrator 510 to be customized to the particular application while the common circuit 500 remain application independent. Customization allows a user to set up an arbitration scheme best suited for the particular application. For example, where triple-redundant power sources 90A–C are available then two of the power sources 90A–B may provide more reliable or cleaner power than the third power source 90C. In this situation, the arbitration method may be arranged so that the common circuit 500 connected to the third power source 90C is always the last to win arbitration. There is no need for the third common circuit 500 to know that it is connected to the third power source 90C.

Application customization may also be extended to the load sensor 106. Where only one load sensor 106 is used among multiple common circuits 500, then that load sensor 106 may be customized to the electrical power characteristics of the load 92. The common circuits 500 do not require any knowledge of the load's electrical characteristics.

Figure 6:
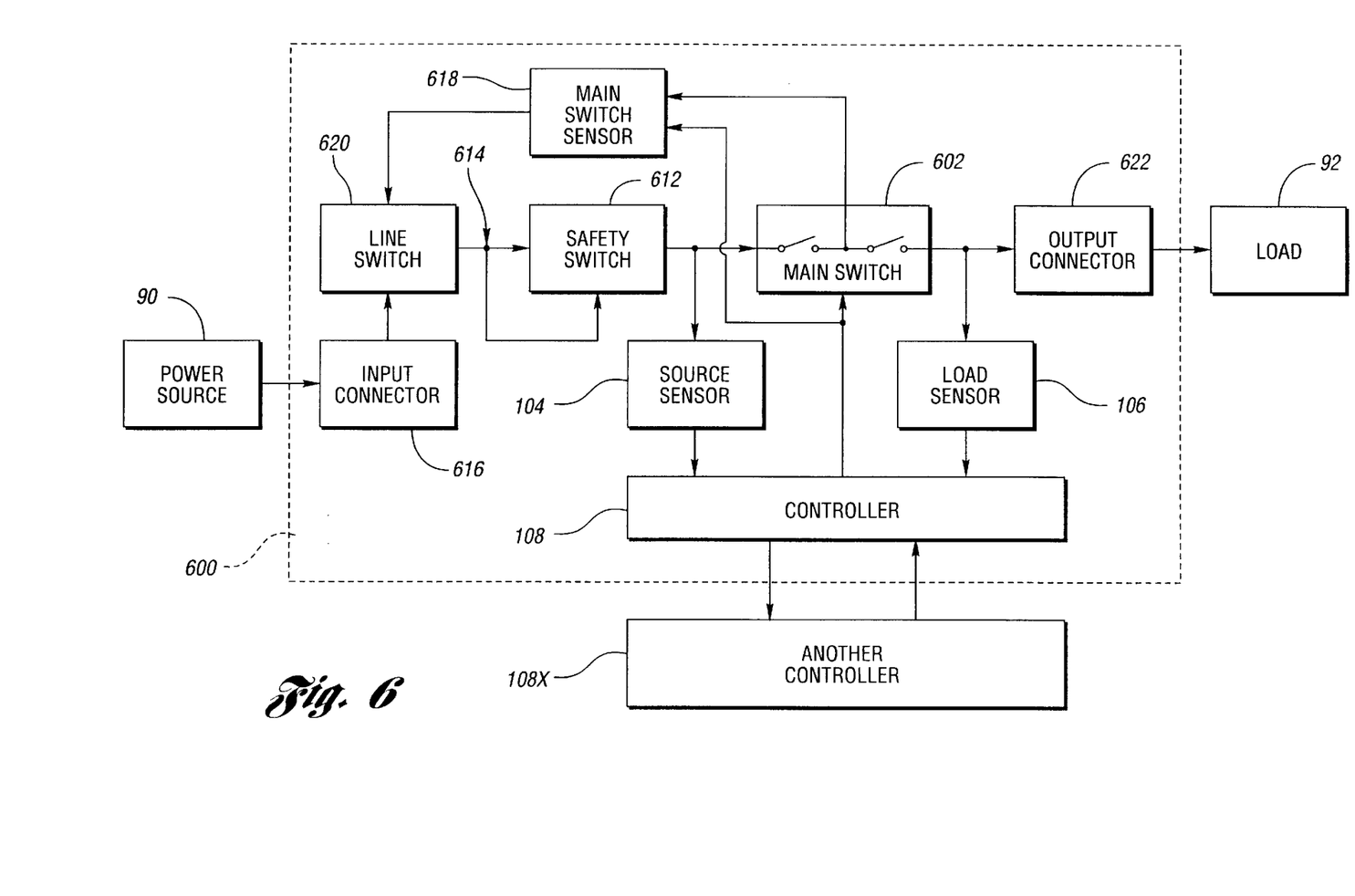
FIG. 6 is a block diagram of an expanded switching circuit.

FIG. 6 shows an expanded switching circuit 600. This embodiment includes a safety capability and a self-test capability. Safety switch 612 is connected in series between the main switch 602 and the power source 90. Safety switch 612 has a open state and a closed state responsive to the voltage present at an input node, as indicated by input node 614. Input node 614 is on an input connector 616 side of safety switch 612. When a voltage at the input node 614 is above a safety threshold, then safety switch 612 obtains the closed state allowing electrical power to flow in either direction through safety switch 612. When the voltage at the input node 614 is below the safety threshold, then safety switch 612 obtains the open state blocking all electrical power flow through the safety switch 612. When safety switch 612 is in the open state, then no electrical power can flow out of the input connector 616. In this case, should input connector 616 become disconnected from the power source 90 for any reason, then any dangling plug (not shown) hanging from the input connector 616, and the input connector 616 itself will be isolated from the rest of the system by the open safety switch 612. In additional to an electromechanical safety isolation device (safety switch 612), a controlled impedance n the form of bleeder resistors (not shown) are placed between input connector 616 and safety ground. They ensure that in the event of input connector 616 being removed from power source 90 and safety switch 612 failing short, that the voltage between any exposed terminals on input connector 616 will be less than 42.4 volts peak alternating current or 60 volts direct current.

The self-test capability of switching circuit 601 is provided by a main switch sensor 618 and a dual-pole main switch 602. Dual-pole main switch 602 has two poles connected in series with each other (two series poles). Both poles are responsive to the same main switch control signal. Dual-pole main switch 602 may be a single device, or two separate switches wired together to operate as one switch.

Main switch sensor 618 senses a main switch voltage present between the two series poles within the dual-pole main switch 602, and receives the main switch control signal as an input. Main switch sensor 618 outputs a line switch control signal that is provided to a line switch 620 connected in series with the dual-pole main switch 602. The main switch sensor 618 normally asserts the closed value on the line switch control signal. Under normal conditions the line switch 620 is commanded into the closed state to allow electrical power to reach the dual-pole main switch 602. When the main switch sensor 618 detects a main switch voltage above a threshold value and the open value for the main switch control signal, then a fault is detected. With the main switch control signal asserting the open value then both poles of the dual-pole main switch 602 should be open and no voltage present between the two poles. If a voltage is present then one or both of the poles have failed in the closed state. Upon detection of this failure, the main switch sensor 618 asserts the open value on the line switch control signal to command the line switch 620 into the open state. The open line switch 620 isolates the power source 90 from the load 92 thus preventing an inadvertent flow of electrical power in either direction between the power source 90 and load 92.

In other embodiments, the safety switch 612 and/or line switch 620 may be connected in series in other positions along the path between the input connector 616 and an output connector 622. For example, the safety switch 612 may be connected between the input connector 616 and the line switch 620.

Figure 7A:
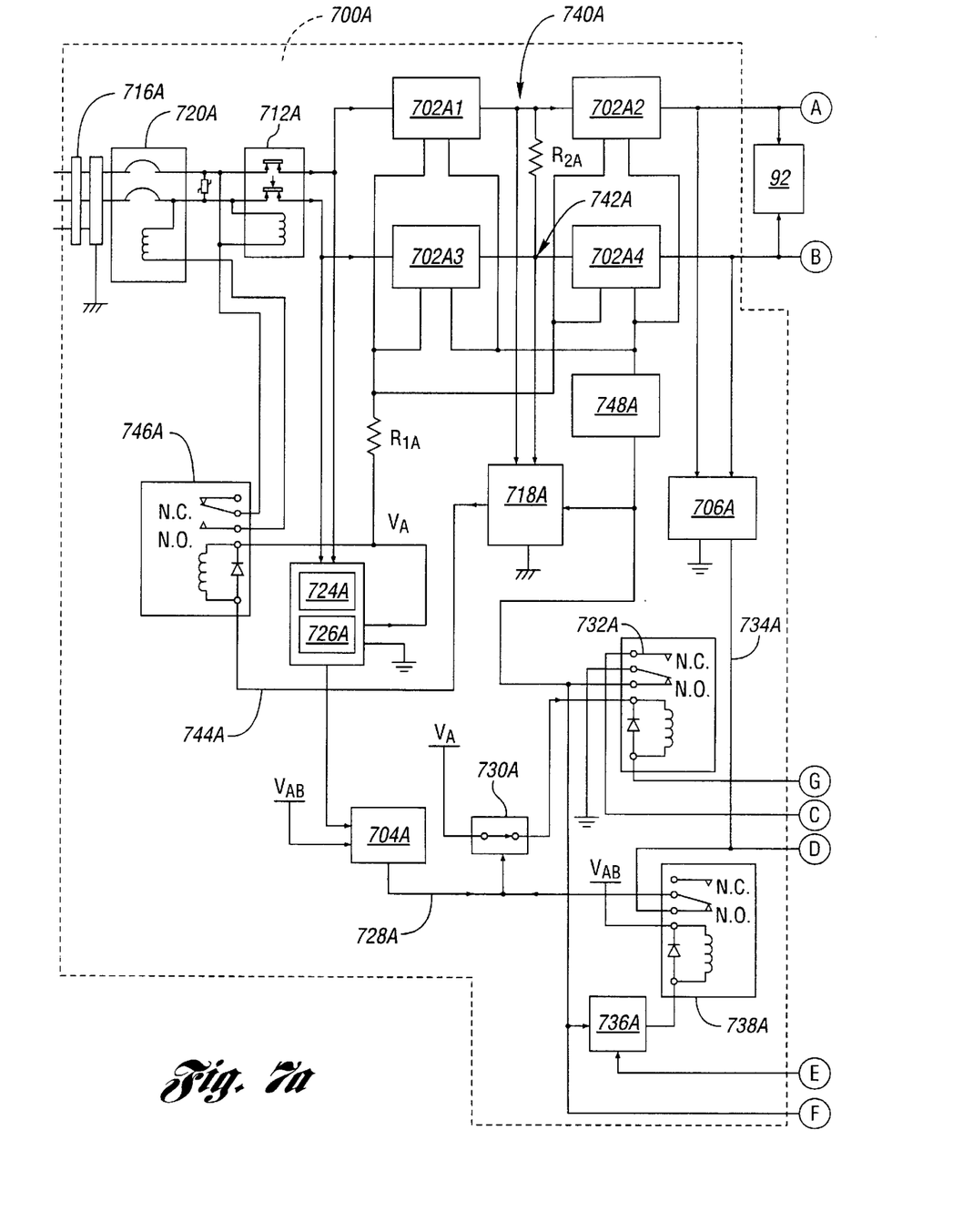
FIGS. 7a and b is a schematic of a forth system embodiment.
Figure 7B:
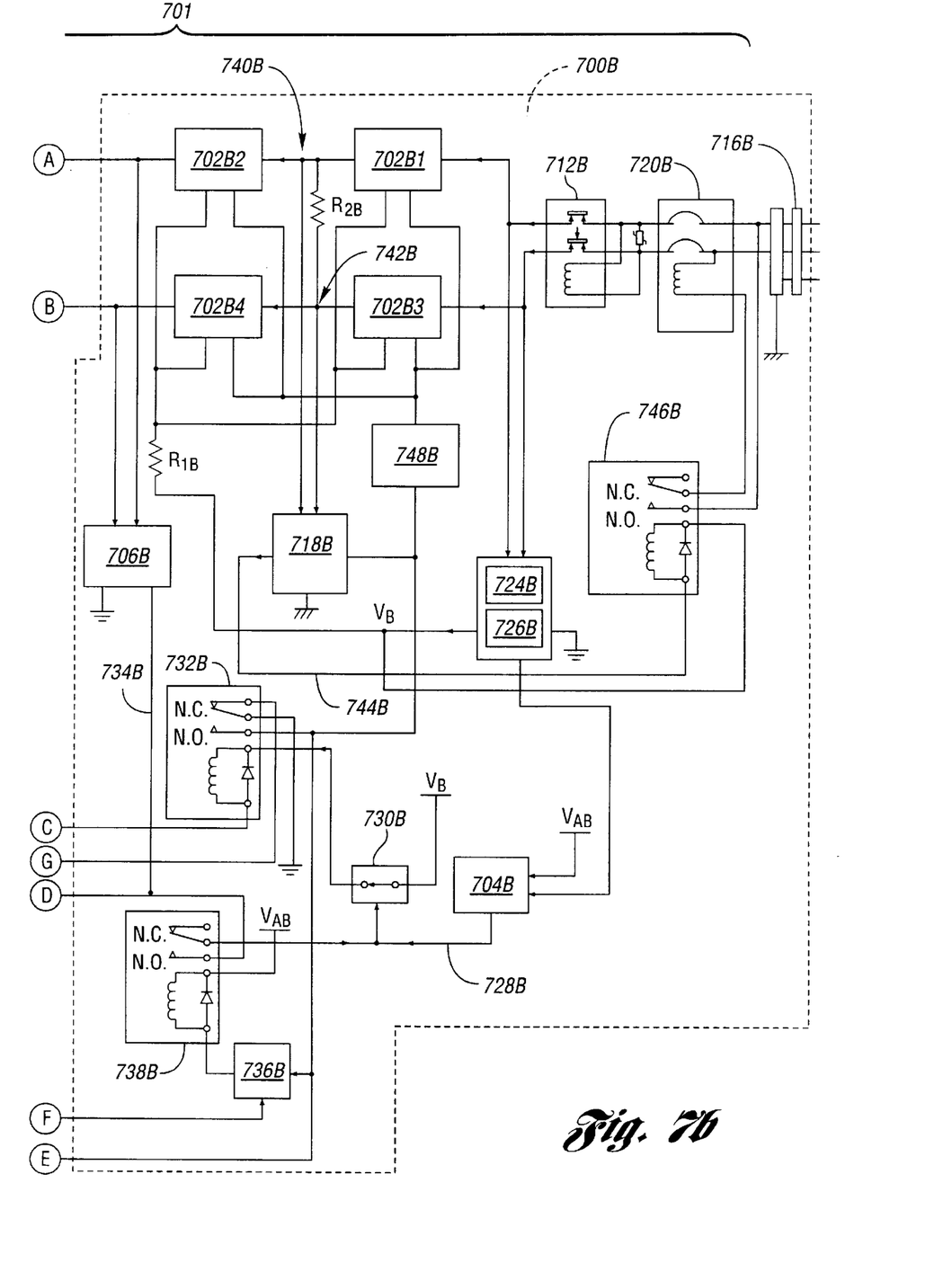

An example of a 220 Vac two phase dual-redundant power switching system is shown in FIGS. 7a and b. In this example, there are two expanded switching circuits 700A–B within the system 701. Switching circuit 700A is connectable between a first power supply 90A (not shown) and the load 92. Switching circuit 700B is connectable between a second power supply 90B (not shown) and the load 92. Since the two switching circuits 700A–B are identical, a description will only be provided of the "A" side, unless otherwise necessary.

Main switch 702A comprises four solid state relays 702A1–A4. Solid state relays 702A1 and 702A2 form one set of two series poles within main switch 702A while solid state relays 702A3 and 702A4 form another set of two series poles within main switch 702A. Solid state relays 702A1–A2 are used to switch one phase from the first power supply 90A while solid state relays 702A3–A4 are used to switch the other phase.

An isolation transformer 724A provides electrical isolation for the low voltage circuitry from the 220 Vac power and reduces the 220 Vac power to a low voltage AC power. A DC power supply 726A converts the low voltage AC power into 12 Vdc ($V_A$ in FIG. 7) and an analog ground. The $V_A$ and $V_B$ power are wire-OR'd together to form a third 12 Vdc power (VAB) that is available when either or both of the switching circuits 700A–B are accepting power from the power sources 90A–B.

The low voltage AC power is provided to the source sensor 704A. Source sensor 704A converts the low voltage AC power into the source status signal. The source status signal is asserted on line 728A, has the pass value when the low voltage AC power is above a low voltage threshold, and has the fail value when the low voltage AC power is absent or below the low voltage threshold.

An electrically controlled switch 730A uses line 728A as its control signal. Electrically controlled switch 730A is in a normally open state when the source status signal on line 728A is at the fail value. When the source status signal is at the pass value then electrically controlled switch 730A obtains a closed state and transfers $V_A$ power to a coil of an interlock relay 732A. The other end of this coil is connected to analog ground through the normally closed wiper of the identical interlock relay 732B in switching circuit 700B. The energized coil in the first interlock relay 732A pulls the wiper to the normally open contact to transition the main switch control signal from the open value (high impedance) to the closed value (analog ground).

The combination of the analog ground (the closed value) for the main switch control signal and the $V_A$ bias provided to the solid state relays 702A1–A4 through $R_{1A}$ cause the solid state relays 702A1–A4 to conduct (the closed state).

The conducting solid state relays 702A1–A4 transfer electrical power from the first power source 90A to the load 92.

The transition of the main switch control signal from a high impedance (open state) to analog ground (closed state) causes a latch 736A to set and the same latch 736B in switching circuit 700B to reset. The set latch 736A energizes a coil in a second interlock relay 738A. With the coil energized, the wiper of the second interlock relay 738A moves to the normally open contact connecting line 728A to line 734A. The reset latch 736B causes the coil in the second interlock circuit 738B to de-energize and thus isolating line 728B from line 734B. Note that lines 734A and 734B may be wired together as shown in FIG. 7 or left isolated from each other.

Power transferred through the main switch 702A is monitored by the load sensor 706A. Load sensor 706A measures the line-to-line load voltage being applied to the load 92. Load sensor 706A outputs the load status signal on line 734A which is wire-OR'd to line 728A and the source status signal.

Electrically controlled switch 730A opens if either the source status signal or the load status signal are asserted at the fail value. If this happens then the coil of the first interlock relay 732A de-energizes and the wiper returns to the normally closed contact. This in turn asserts the open value on the main switch control signal causing the solid state relays 702A1–A4 of the main switch 702A to stop conducting (the open state). The high impedance of the non-conducting solid state relays 702A1–A4 stops the transfer of electrical power from the first power source 90A to the load 92. Finally, the wiper of the first interlock relay 732A connects with the normally closed contact (tied to analog ground) thus enabling the coil of the first interlock relay 732B.

Main switch sensor 718A monitors the line-to-earth ground voltage (main switch voltage) of each phase of power at nodes 740A and 742A. Main switch senor 718A also receives the main switch control signal as an input. When the main switch control signal asserts the open value and the voltage at either or both nodes 740A and 742A are greater than a threshold, then the main switch sensor 718A pulls line 744A to analog ground (the open value). This failure condition is caused by one of the solid state relays 702A1–A4 shorting out.

Line 744A at analog ground causes a trip relay 746A to energize and its associated wiper to connect with the normally open contact. The trip relay 746A wiper connecting to the normally open contact closes a circuit (line switch control signal) that causes a remote trip circuit breaker (line switch) 720A to trip (the open state). In the preferred embodiment, the remote trip circuit breakers 720A–B are chosen to remain in the tripped state once tripped until they are manually reset. This prevents any oscillations that may take place when the tripped circuit breaker 720A causes a loss of voltage an nodes 740A and 742A, which in turn causes main switch sensor 718A to assert the closed value for the line switch control signal.

A delay circuit 748A delays the main switch control signal to the solid state relays 702A1–A4 for about 10 milliseconds to avoid any race conditions between the main switch sensor 718A and the solid state relays 702A1–A4. A bleed off resistor $R_{2A}$ is connected between nodes 740A and 742A to reduce the effects of leakage currents through the solid state relays 702A1–A4 when they are all switched to the off state.

Safety switch 712A is a normally-open contactor with its own coil connected across the two phases of the power. When input connector 716A is connected to the first power source 90A and the first power source 90A is producing power, then the coil of the contactor 712A is energized and the contactor 712A is in the closed state. When power is removed from input connector 716A, for example if a power cord (not shown) between the input connector 716A and the first power source 90A is disconnected at either end, then contactor 712A will de-energize to the open state to provide a 4 millimeter isolation gap. The isolation gap makes the plugs of the dangling power cord safe to touch.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A circuit for switching electrical power between a power source and a load, the circuit comprising:

a main switch connectable between the load and the power source;

a load sensor operative to convert a load voltage representative of the load into a load status signal;

a source sensor operative to convert a source voltage representative of the power source into a source status signal; and a controller capable of obtaining a master status through arbitration, the controller being operative to command the main switch to an open state and relinquish the master status in response to at least one of the source status signal and the load status signal asserting a fail value;

a connector in series with the main switch and connectable to the power source; and a safety switch in series with the connector, the safety switch being operative to transition from the open state to the closed state in response to an input voltage present between the safety switch and the connector becoming greater than a safety threshold, and transition from the closed state to the open state in response to the input voltage becoming less than the safety threshold.

2. The circuit of claim 1 wherein the controller is further operative to command the main switch to a closed state in response to obtaining the master status and the source status signal asserting a pass value.

3. The circuit of claim 1 further comprising:

two poles in series with each other within the main switch;

a line switch in series with the main switch; and a main switch sensor operative to command the line switch to the open state in response to the main switch being commanded to the open state and a main switch voltage present between the two poles within the main switch being greater than a threshold value.

4. The circuit of claim 3 further comprising two second poles in series each other within the main switch, and the main switch sensor being further operative to command the line switch to the open state in response to the main switch being commanded to the open state and a second main switch voltage present between the two second poles within the main switch being greater than the threshold value.

5. The circuit of claim 3 further comprising:

the line switch being a remote trip circuit breaker operative to trip in response to the line switch being commanded to the open state.

6. A system for switching electrical power from one of a plurality of power sources to a load, the system comprising:
- a plurality of main switches, each respective main switch being connectable between the load and one respective power source;
- a load sensor operative to convert a load voltage representative of the load into a load status signal;
- a plurality of source sensors, each respective source sensor being operative to convert one respective source voltage representative of the respective power source into a respective source status signal;
- a controller operative to command the plurality of main switches so that at most one of the plurality of main switches is commanded to a closed state at any time in response to the load status signal and the plurality of source status signals, the controller being a plurality of controllers, each respective controller being operative to command the respective main switch to the open state and relinquish a master status in response to at least one of the respective source status signal and the load status signal asserting a fail value; and
- an arbitrator operative to allocate the master status to at most one controller at a time from among the plurality of controllers.

7. The system of claim 6 further comprising:
- a plurality of pole pairs, each respective pole pair defining two poles in series with each other within one respective main switch;
- a plurality of line switches, each respective line switch being in series with the respective main switch; and
- a plurality of main switch sensors, each respective main switch sensor being operative to command one respective line switch to the open state in response to the respective main switch being commanded to the open state and a respective main switch voltage present between the two poles within the respective main switch being greater than a threshold value.

8. The circuit of claim 7 further comprising:
- a plurality of second pole pairs, each respective second pole pair defining two second poles in series with each other within one respective main switch; and
- each respective main switch sensor being further operative to command the respective line switch to the open state in response to the respective main switch being commanded to the open state and a respective second main switch voltage present between the two second poles within the respective main switch being greater than the threshold value.

9. The circuit of claim 7 further comprising:
- each respective line switch being a remote trip circuit breaker operative to trip in response to the respective line switch being commanded to the open state.

10. The circuit of claim 6 further comprising:
- a plurality of connectors, each respective connector being in series with one respective main switch and connectable to the respective power source; and
- a plurality of safety switches, each respective safety switch being in series with the respective connector, and each respective safety switch being operative to transition from the open state to the closed state in response to a respective input voltage present between the respective safety switch and the respective connector being greater than a safety threshold, and transition from the closed state to the open state in response to the respective input voltage being less than the safety threshold.

11. The system of claim 6 further comprising:
- the controller being a plurality of controllers, and each respective controller being operative to arbitrate among the plurality of controllers so that at most one respective main switch is commanded to the closed state at any time.

12. The system of claim 6 wherein each controller is further operational to command one respective main switch to the closed state in response to obtaining the master status and a respective source status signal asserting a pass value, and each respective controller being operative.

13. A method for operating a circuit having a main switch connectable between a power source and a load, a connector in series with the main switch, and a safety switch in series between the connector and the main switch, the method comprising:
- converting a load voltage representative of the load into a load status signal;
- converting a source voltage representative of the power source into a source status signal;
- arbitrating for a master status in response to the source status asserting a pass value;
- commanding the main switch to an open state and relinquishing the master status in response to at least one of the source status signal and the load status signal asserting a fail value;
- transitioning the safety switch from the open state to the closed state in response to an input voltage present between the connector and the safety switch being greater than a safety threshold; and
- transitioning the safety switch from the closed state to the open state in response to the input voltage being less than the safety threshold.

14. The method of claim 13 further comprising:
- commanding the main switch to a closed state in response to obtaining the master status.

15. The method of claim 13 where the circuit includes a line switch is in series with the main switch, and the main switch having two poles in series with each other, the method further comprising:
- commanding the line switch to the open state in response to the main switch being commanded to the open state and a main switch voltage present between the two poles within the main switch being greater than a threshold value.

16. The method of claim 15 where the main switch has two second poles in series with each other, the method further comprising:
- commanding the line switch to the open state in response to the main switch being commanded to the open state and a second main switch voltage present between the two second poles within the main switch being greater that the threshold value.

17. The method of claim 15 further comprising:
- latching the line switch in the open state in response to commanding the line switch to the open state.

18. The method of claim 13 wherein the circuit has a plurality of main switches that includes the main switch, and where arbitrating for the master status comprises:
- allocating the master status to the main switch in response to one other main switch of the plurality of main switches being commanded to the closed state and the load status signal asserting the fail value; and
- allocating the master status to the main switch in response to all of the plurality of main switches being commanded to the open state.

* * * * *